United States Patent [19]
Sugimoto et al.

[11] Patent Number: 5,661,508
[45] Date of Patent: Aug. 26, 1997

[54] INK JET RECORDING METHOD AND APPARATUS FOR RECORDING THINNED RECORDING DATA

[75] Inventors: Hitoshi Sugimoto, Yokohama; Shigeyasu Nagoshi, Kawasaki; Miyuki Matsubara, Tokyo, all of Japan

[73] Assignee: Canon Kabushiki Kaisha, Tokyo, Japan

[21] Appl. No.: 641,777

[22] Filed: Apr. 30, 1996

Related U.S. Application Data

[63] Continuation of Ser. No. 402,326, Mar. 10, 1995, abandoned, which is a continuation of Ser. No. 907,806, Jul. 2, 1992, abandoned.

[30] Foreign Application Priority Data

Jul. 3, 1991 [JP] Japan ................................. 3-162933

[51] Int. Cl.⁶ .................................................... B41J 2/21
[52] U.S. Cl. ................................................. 347/9; 347/41
[58] Field of Search .............................. 347/9, 15, 41, 347/12; 358/298

[56] References Cited

U.S. PATENT DOCUMENTS

| | | | |
|---|---|---|---|
| 4,313,124 | 1/1982 | Hara | 346/140 R |
| 4,345,262 | 8/1982 | Shirato et al. | 346/140 R |
| 4,459,600 | 7/1984 | Sato et al. | 346/140 R |
| 4,463,359 | 7/1984 | Ayata et al. | 346/140 R |
| 4,558,333 | 12/1985 | Sugitani et al. | 346/140 R |
| 4,723,129 | 2/1988 | Endo et al. | 346/140 R |
| 4,740,796 | 4/1988 | Endo et al. | 346/140 R |
| 5,220,342 | 6/1993 | Moriyama | 346/140 R |

FOREIGN PATENT DOCUMENTS

| | | |
|---|---|---|
| 58-011163 | 1/1983 | Japan. |
| 59-123670 | 7/1984 | Japan. |
| 59-138461 | 8/1984 | Japan. |

*Primary Examiner*—Valerie Lund
*Attorney, Agent, or Firm*—Fitzpatrick, Cella, Harper & Scinto

[57] ABSTRACT

In a color ink jet recording system for performing color image recording on a recording medium using a plurality of recording heads and different color inks, the thinning ratio for at least one (e.g., black K) of the recording heads is set to be different from the thinning ratio for the remaining recording heads (e.g., cyan C, and the like). The total implantation quantity of the black ink can be twice the normal quantity without increasing the number of times of scan operations, and without causing boundary blur, and the print density of black can be increased.

45 Claims, 11 Drawing Sheets

ORIGINAL PRINT SIG

FIG. 3B THINNING PATTERN

THINNING PRINT SIG $S_1$

THINNING PRINT SIG $S_2$

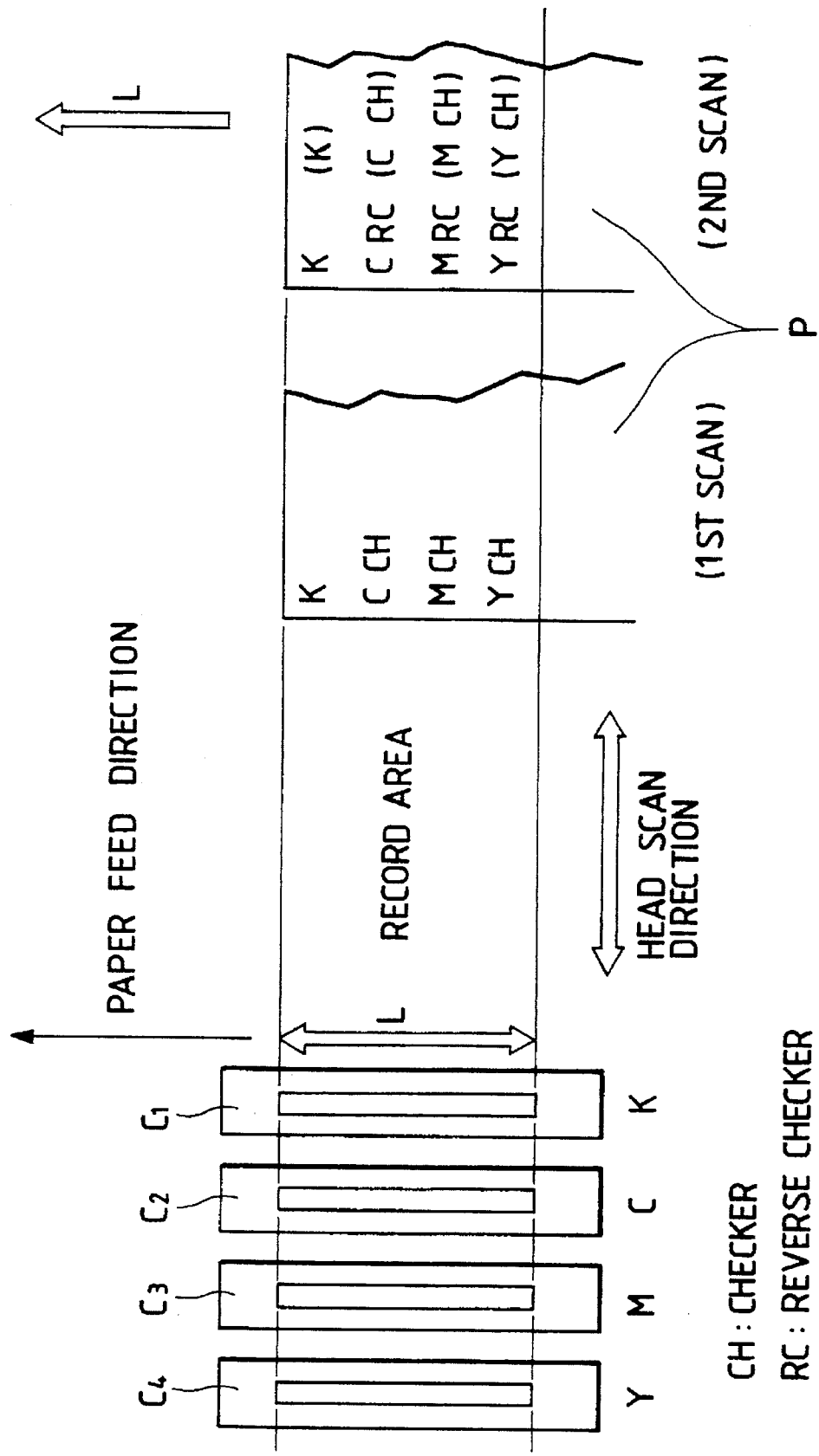

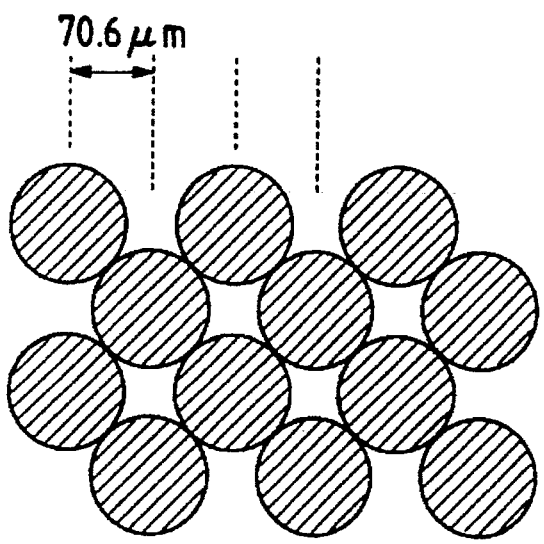
FIG. 5(a)
(1ST SCAN)
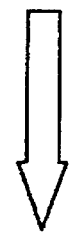
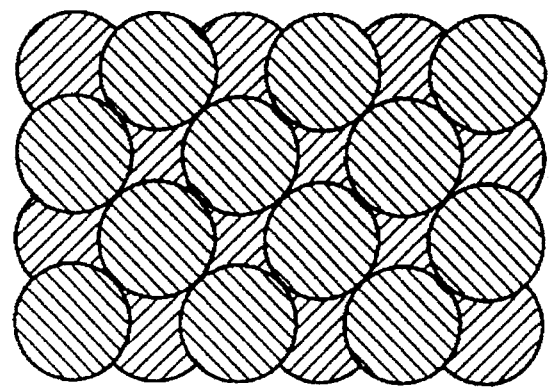
FIG. 5(b)
(2ND SCAN)

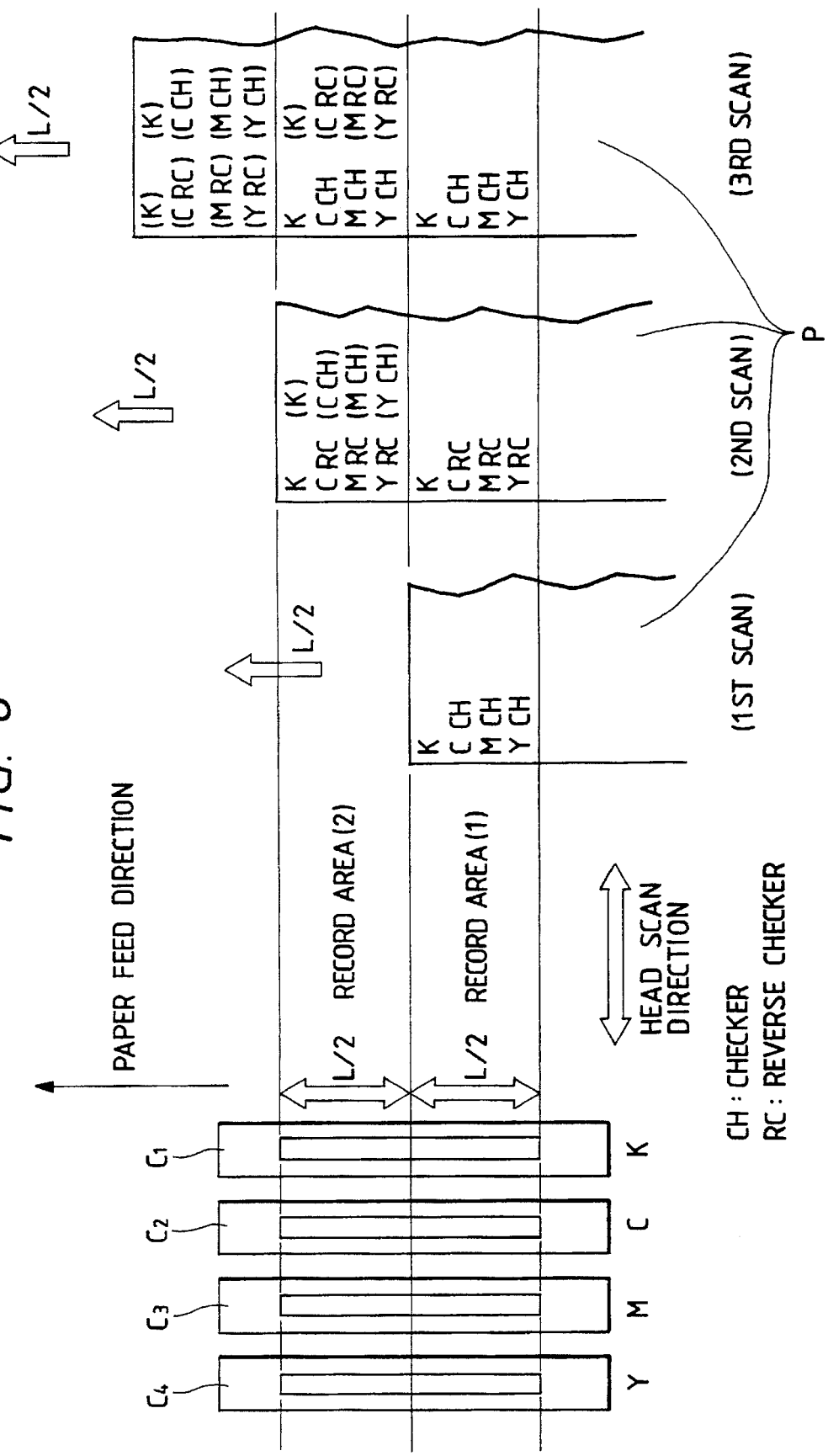

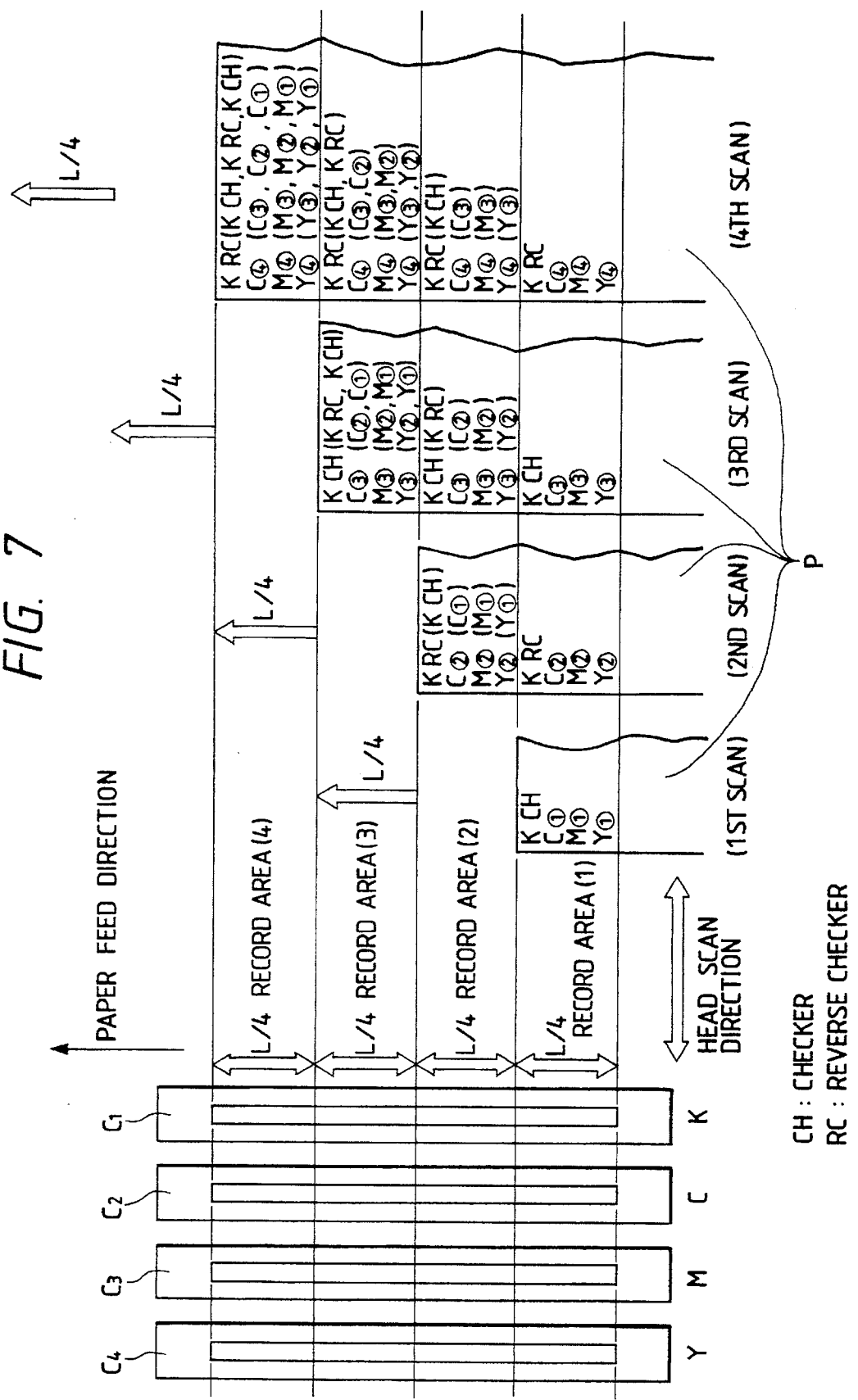

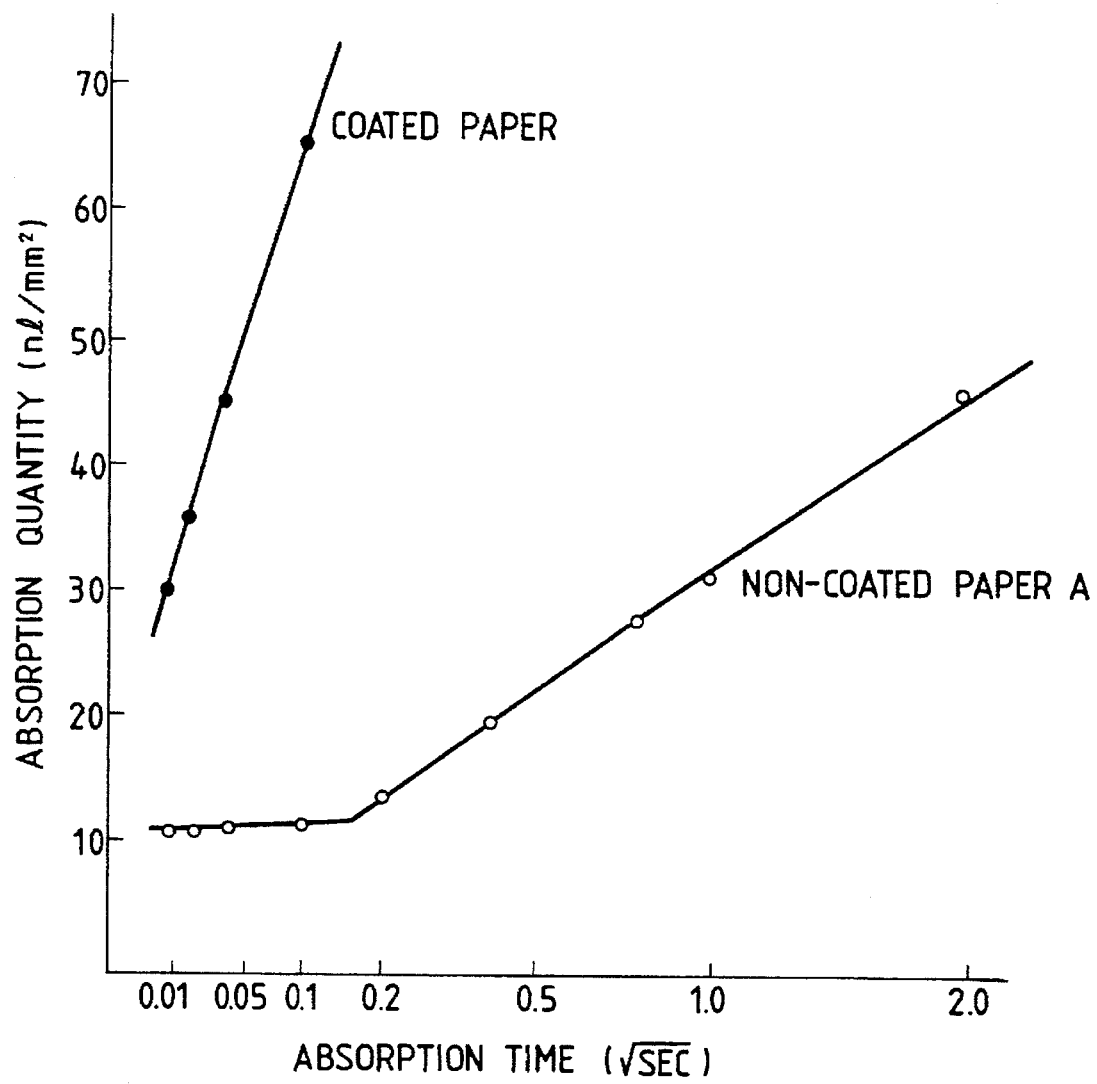

FIG. 11

IMAGE BLUR ESTIMATION

| INK IMPLANTATION DENSITY (nℓ/mm²) | 10.0 | 12.5 | 15.0 | 17.5 | 20.0 | 22.5 | 25.0 | 27.5 | 30.0 |
|---|---|---|---|---|---|---|---|---|---|
| NON-COATED PAPER A | ○ | ○ | △ | × | × | × | × | × | × |
| NON-COATED PAPER B | ○ | ○ | ○ | × | × | × | × | × | × |
| NON-COATED PAPER C | ○ | ○ | △ | △ | × | × | × | × | × |
| COATED PAPER D | ○ | ○ | ○ | ○ | ○ | ○ | ○ | △ | △ |

INK JET RECORDING METHOD AND APPARATUS FOR RECORDING THINNED RECORDING DATA

This application is a continuation of application Ser. No. 08/402,326 filed Mar. 10, 1995, which was a continuation of application Ser. No. 07/907,806, filed on Jul. 2, 1992, both now abandoned.

BACKGROUND OF THE INVENTION

1. Field of the Invention

The present invention relates to an ink jet recording method and apparatus, which comprises a plurality of recording heads each having a plurality of ejection orifices, and performs recording by ejecting an ink to a recording medium, and, more particularly, to an ink jet recording method and apparatus for recording thinned recording data.

2. Related Background Art

In recent years, OA equipments such as computers, wordprocessors, copying machines, and the like have come into general use, and many recording systems for recording apparatuses for these OA equipments have been developed. An ink jet recording apparatus has excellent features. That is, the ink jet recording apparatus allows easy high-resolution recording, and has a high-speed, low-noise, and low-cost structure. In order to meet needs for color recording, many color ink jet recording apparatuses have also been developed.

An ink jet recording apparatus ejects an ink from nozzles to cause the ink to be attached to a recording paper sheet, thereby forming an image. Conventionally, in order to improve the gradation characteristics of a recorded image, and to increase the density of the image, a plurality of pixels that form an image on a recording medium are formed by a plurality of overlapping ink droplets. In order to increase the density of adjacent pixels, a plurality of ink droplets are implanted at a high density. Upon application of these techniques to color recording, color reproducibility can be improved. Furthermore, when the recording medium is, e.g., a transparent film for a transmission type OHP (overhead projector), the transmission density of an image recorded on such a transparent film must be entirely increased. In this case, the above-mentioned techniques are effective.

In a color ink jet recording apparatus, color mixing (boundary blur) occurs at a boundary portion between a given color and another color due to diffusion of dyes, resulting in deteriorated quality of an image. The boundary blur occurs in such a manner that when an ejected ink dot, which is not sufficiently dried and fixed, is present on and in a sheet surface, it is mixed with another adjacent color ink dot. In other words, the boundary blur occurs since dyestuffs (colorants such as dyes, pigments, or the like) are diffused at a liquid-liquid interface between different inks.

In a recording medium such as an OHP film having a limited ink reception quantity, or a recording medium having poor ink absorbency, the ink absorption quantity or speed is limited, and the ink overflows from a pixel, resulting in deteriorated quality of an image. In particular, since a plurality of recording heads corresponding to ink colors are arranged in a scan direction, when different inks are implanted to overlap each other, the implantation density per unit time is increased, and the problem of ink overflow is outstanding. A color ink jet recording apparatus normally forms intermediate colors by properly overlapping cyan, magenta, and yellow color ink dots. More specifically, red can be realized by overlapping magenta and yellow ink dots; blue can be realized by overlapping cyan and magenta ink dots; and green can be realized by overlapping cyan and yellow ink dots. Note that black can be realized by overlapping three colors, i.e., cyan, magenta, and yellow. At this time, only black is separately implanted (using a black ink) due to poor color development of black and an increase in ink implantation quantity per unit area upon overlapping of inks of three colors. Therefore, since each of red, blue, and green portions where inks of two colors are implanted for each ink dot particularly has a high ink printing density per unit time, the above-mentioned ink overflow easily occurs, and boundary blur easily occurs at a boundary portion between these colors and another adjacent color.

A recording paper sheet (coated paper sheet) having a specially increased ink absorption quantity is known. However, when an ink jet recording apparatus is arranged for only such special-purpose paper sheets, a user cannot use other types of paper, and paper sheets becomes very expensive. When a user uses another type of paper or recording medium having poor absorbency, a recording error occurs. In the worst case, the user may erroneously judge that a recording head is defective, and may waste the recording head.

In recent years, with the advent of low-cost recording apparatuses, the demand for recording apparatuses that can perform recording on normal paper (e.g., PPC paper) having no special coating for improving ink absorbency has increased. However, a recording paper sheet having poor ink absorbency not only easily causes boundary blur at a boundary portion between different colors but also has a low print density as compared to an ink jet special-purpose paper sheet, which is manufactured in consideration of ink absorbency. In a recorded image, an importance is placed especially on the density of black used for characters and thin lines.

In the conventional method, in order to prevent boundary blur caused by ink overflow, a multi-pass print method is proposed. In this method, the number of ink droplets to be implanted in a single scan operation of each recording head is thinned out at the same ratio to decrease the total quantity of ink droplets to be implanted in the single scan operation, and a plurality of number of times of scan operations are performed at predetermined time intervals. In order to increase the density of black for characters and thin lines, a combined method of the multi-pass print method and a method of implanting only a black ink dot twice at the same position is also proposed.

However, in this method, the number of times of scan operations is doubled since black ink is implanted twice at the same positions for black dots, thus considerably decreasing the recording speed.

SUMMARY OF THE INVENTION

The present invention has been made in consideration of the above-mentioned problems, and has as its object to provide an ink jet recording method and apparatus, which are free from undesirable blur at a boundary portion between different colors.

It is another object of the present invention to provide an ink jet recording method and apparatus, which can obtain a clear, sharp recorded image having a high print density of black.

It is still another object of the present invention to provide an ink jet recording method and apparatus, which are free from a decrease in recording speed.

In order to achieve the above objects, according to the present invention, there is provided an ink jet recording apparatus for recording a color image on a recording medium using a plurality of recording heads for ejecting different color inks, comprising generation means for generating thinned recording data by thinning out, at a predetermined thinning ratio, recording data to be supplied to the plurality of recording heads, scan means for scanning the plurality of recording heads relative to the recording medium, head driving means for supplying the thinned recording data to the plurality of recording heads during the relative scan operation by the scan means, so that a thinned image is recorded on the recording medium, and control means for setting the thinning ratio of the generation means for at least one of the plurality of recording heads to be different from the thinning ratio for the remaining recording heads.

In order to achieve the above objects, according to the present invention, there is also provided an ink jet recording apparatus for recording a color image on a recording medium using at least first and second recording heads for respectively ejecting first and second color inks, comprising main scan means for main scanning the first and second recording heads relative to a single area of the recording medium a plurality of number of times, generation means for generating thinned recording data by thinning out recording data to be supplied to the first and second recording heads at a predetermined thinning ratio using different patterns in correspondence with the plurality of number of times of main scan operations, head driving means for supplying the thinned recording data to the first and second recording heads during the main scan operations by the main scan means, so that a thinned image is recorded on the recording medium, and control means for setting the thinning ratio of the generation means for the first recording head to be different from the thinning ratio for the second recording head.

Furthermore, in order to achieve the above objects, according to the present invention, there is also provided an ink jet recording method for recording a color image on a recording medium, comprising the steps of: providing a plurality of recording heads for ejecting different color inks; generating thinned recording data by thinning out recording data to be supplied to the plurality of recording heads at a predetermined thinning ratio, wherein the thinning ratio for at least one of the plurality of recording heads is different from the thinning ratio for the remaining recording heads; scanning the plurality of recording heads relative to the recording medium; and supplying the thinned recording data to the plurality of recording heads during the relative scan periods, so that a thinned image is recorded on the recording medium.

BRIEF DESCRIPTION OF THE DRAWINGS

FIGS. 3A to 3D are views for explaining a method of generating a thinning print signal;

FIG. 4 is an explanatory view of a recording method according to the first embodiment of the present invention;

FIGS. 5(a) and 5(b) are explanatory views for explaining a 50% thinning recording method;

FIG. 6 is an explanatory view of a recording method according to the second embodiment of the present invention;

FIG. 7 is an explanatory view of a recording method according to the third embodiment of the present invention;

FIG. 9 is a graph showing the ink absorption characteristics of coated paper and non-coated paper;

FIG. 11 shows a table for explaining image estimation when recording is performed on coated paper and non-coated paper.

DESCRIPTION OF THE PREFERRED EMBODIMENTS

Figure 1:
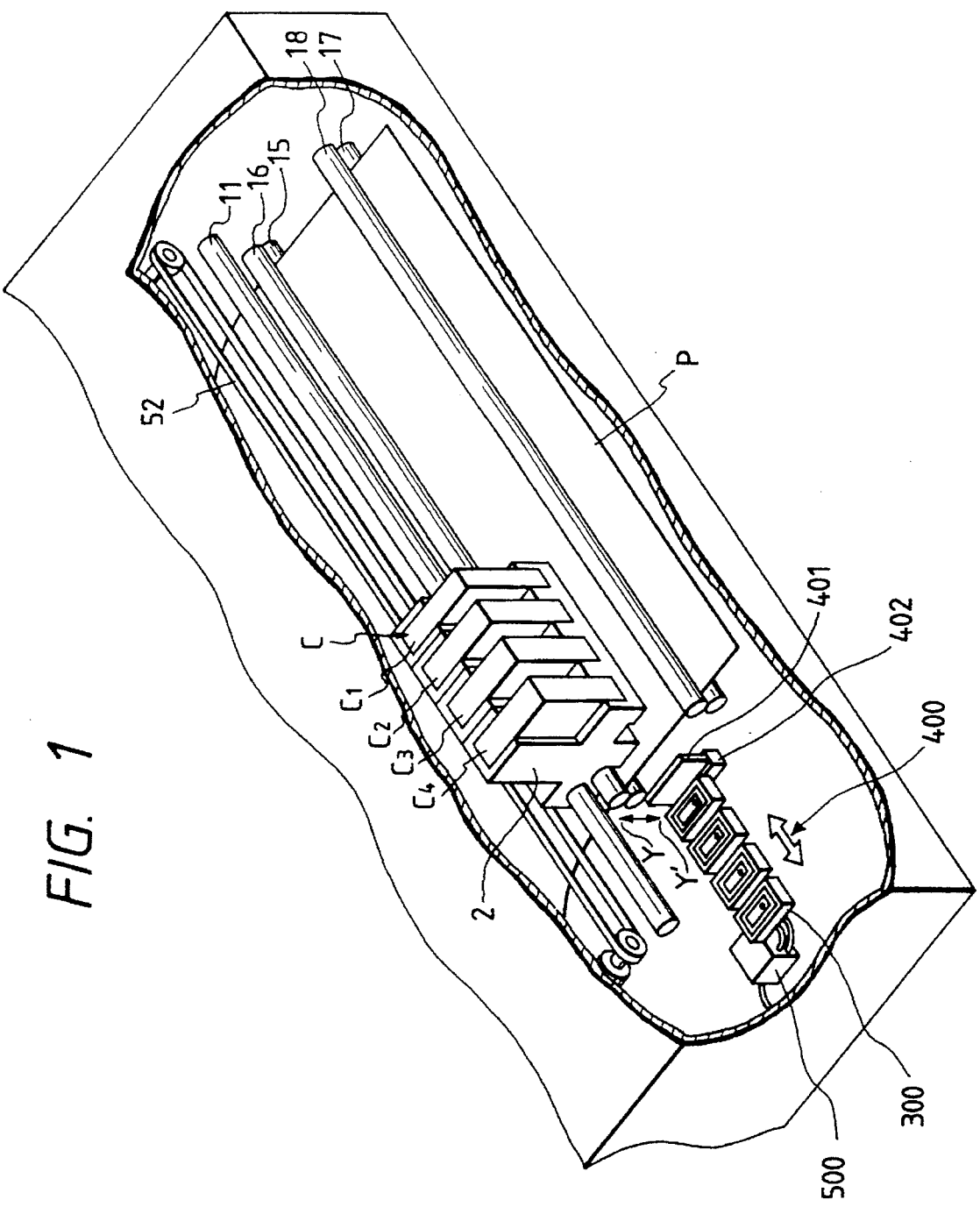
FIG. 1 is a partially cutaway perspective view of an ink jet recording apparatus which can adopt the present invention.

The preferred embodiments of the present invention will be described hereinafter with reference to the accompanying drawings. FIG. 1 is a partially cutaway perspective view of an ink jet recording apparatus which can adopt the present invention. In FIG. 1, an ink cartridge C has an ink tank portion on its upper portion, and recording heads 23 (not shown) on its lower portion. The ink cartridge C is provided with a connector for receiving, e.g., signals for driving the recording heads 23. A carriage 2 aligns and carries four cartridges C1, C2, C3, and C4 (which store different color inks, e.g., black, cyan, magenta, and yellow inks). The carriage 2 is provided with a connector holder, electrically connected to the recording heads 23, for transmitting, e.g., signals for driving recording heads.

The ink jet recording apparatus includes a scan rail 11, extending in the main scan direction of the carriage 2, for slidably supporting the carriage 2, and a drive belt 52 for transmitting a driving force for reciprocally moving the carriage 2. The apparatus also includes pairs of convey rollers 15 and 16, and 17 and 18, arranged before and after the recording positions of the recording heads, for clamping and conveying a recording medium, and a recording medium P such as a paper sheet, which is urged against a platen (not shown) for regulating a recording surface of the recording medium P to be flat. At this time, the recording head 23 of each ink jet cartridge C carried on the carriage 2 projects downward from the carriage, and is located between the convey rollers 16 and 18 for conveying the recording medium. The ejection orifice formation surface of each recording head faces parallel to the recording medium P urged against the guide surface of the platen (not shown). Note that the drive belt 52 is driven by a main scan motor 29, and the pairs of convey rollers 15 to 18 are driven by a sub-scan motor 26, as in FIG. 2.

In the ink jet recording apparatus of this embodiment, a recovery system unit 400 is arranged at the home position side (at the left side in FIG. 1). The recovery system unit 400 includes cap units 300 arranged in correspondence with the plurality of ink jet cartridges C each having the recording head 23. Upon movement of the carriage 2, the cap units 300 can be slid in the right-to-left direction and be also vertically movable. When the carriage 2 is located at the home position, the cap units 300 are joined to the corresponding recording heads 23 to cap them, thereby preventing an ejection error of the ink in the ejection orifices of the recording heads 23. Such ejection error is caused by evaporation and hence an increased viscosity and solidification of the attached inks.

The recovery system unit 400 also includes a pump unit 500 communicating with the cap units 300. When the recording head 23 causes an ejection error, the pump unit 500 is used for generating a negative pressure in suction recovery processing executed by joining the cap unit 300 and the corresponding recording head 23. Furthermore, the recovery system unit 400 includes a blade 401 as a wiping member formed of an elastic member such as rubber, and a blade holder 402 for holding the blade 401.

In the four ink jet cartridges carried on the carriage 2, the cartridge C1 stores a black (to be abbreviated to as K hereinafter) ink, the cartridge C2 stores a cyan (to be abbreviated to as C hereinafter) ink, the cartridge C3 stores a magenta (to be abbreviated to as M hereinafter) ink, and the cartridge C4 stores a yellow (to be abbreviated to as Y hereinafter) ink. The inks overlap each other in this order. Intermediate colors can be realized by properly overlapping C, M, and Y color ink dots. More specifically, red can be realized by overlapping M and Y; blue, C and M; and green, C and Y. Black can be realized by overlapping three colors C, M, and Y. However, since black realized by overlapping three colors C, M, and Y has poor color development, a chromatic edge is formed due to difficulty in precise overlapping of three colors, and the ink implantation density per unit time becomes too high. For these reasons, only black is implanted separately (using a black ink).

Figure 2:
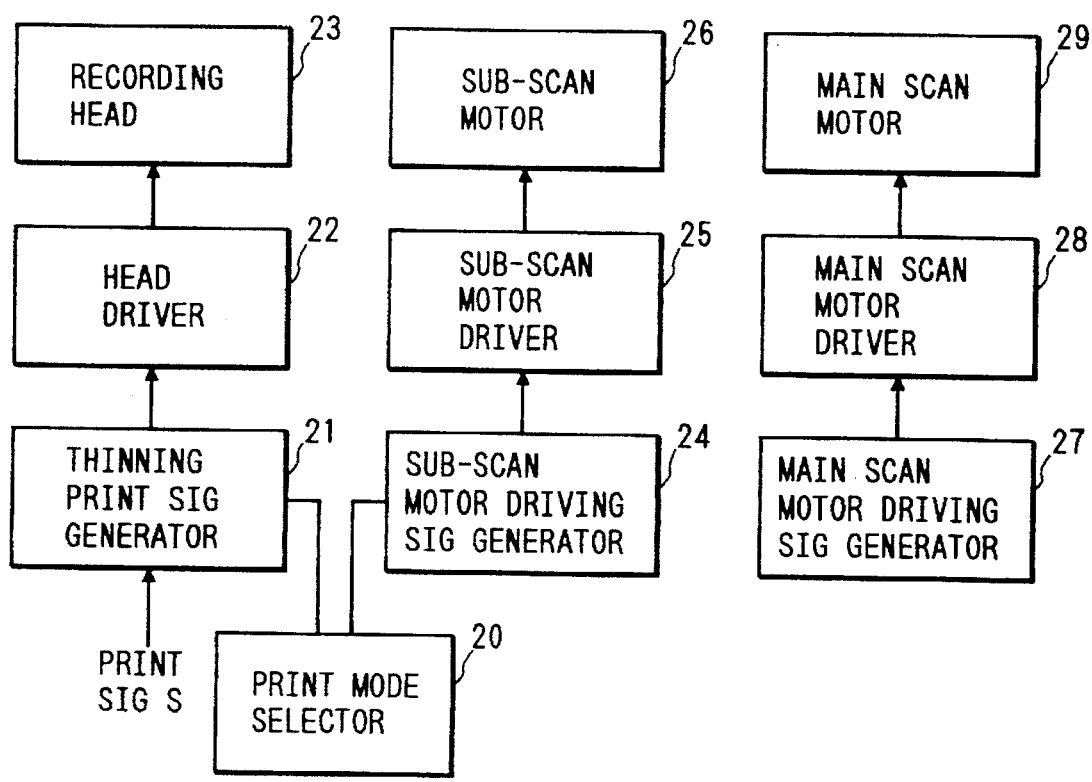
FIG. 2 is a block diagram of the ink jet recording apparatus which can adopt the present invention.

FIG. 2 is a control block diagram of the ink jet recording apparatus which performs a thinning multi-pass print operation that can adopt the present invention. In FIG. 2, the recording head 23 has a plurality of ink ejection orifices, and a plurality of electrothermal converting elements as ejection energy generation elements arranged in correspondence with the ejection orifices. In the recording head 23, an ejection signal according to recording data is supplied to the electrothermal converting elements, and bubbles formed by these elements cause a change in state in the ink, thereby ejecting ink droplets from the ejection orifices. The main scan motor 29 drives the drive belt 52. A print mode selector 20 switches a print mode automatically or by a manual switch operation of a user. A thinning print signal generator 21 generates a thinning print signal for performing the thinning multi-pass print operation from an input image signal (to be referred to as a print signal hereinafter) S according to a selected mode when the print mode selector 20 selects a thinning multi-pass print mode. A head driver 22 drives the recording head 23 according to a signal from the thinning print signal generator 21. A main scan motor driving signal generator 27 generates a signal for driving the main scan motor 29. The generator 27 sequentially generates driving signals corresponding in number to passes when the thinning multi-pass print mode is selected by the print mode selector 20. A main scan motor driver 28 controls the driving operation of the main scan motor 29 according to a signal from the main scan motor driving signal generator 27. A sub-scan motor driving signal generator 24 generates a signal for driving the sub-scan motor 26. When the thinning multi-pass print mode is selected by the print mode selector 20, the generator 24 generates a driving signal for controlling the paper feed amount according to the selected mode. A sub-scan motor driver 25 controls the driving operation of the sub-scan motor 26 according to a signal from the sub-scan motor driving signal generator 24. When color recording is performed, a plurality of recording heads 23 are arranged, and a plurality of sets of thinning print signal generators 21 and head drivers 22 can be arranged in correspondence with the plurality of recording heads 23.

The print mode selector 20, the thinning print signal generator 21, the sub-scan motor driving signal generator 24, and the main scan motor driving signal generator 27 may be realized by software control by a controller such as a CPU.

Figure 3A:
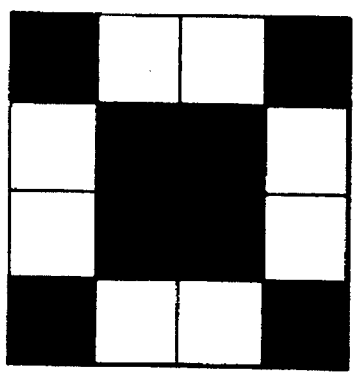
Figure 3C:
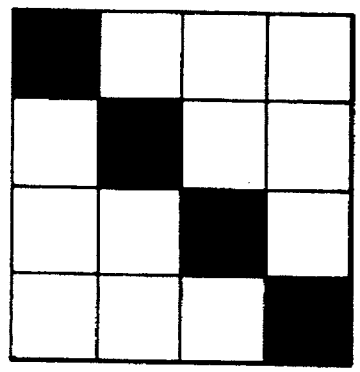
Figure 3D:
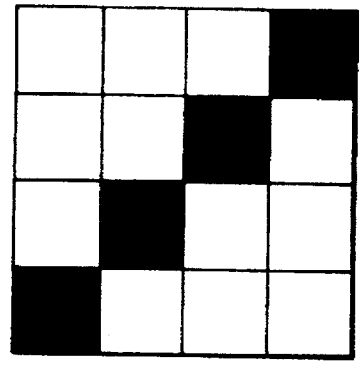

In this ink jet recording apparatus, the thinning multi-pass print operation is performed as follows. When the print mode selector 20 selects the thinning multi-pass print mode automatically or a manual switch operation by a user, as shown in FIG. 3A, an input image signal is thinned out by the thinning print signal generator 21 according to a predetermined thinning pattern (FIG. 3B), and is divided into thinning print signals S1 and S2, as shown in FIGS. 3C and 3D. Of these thinning print signals, the thinning print signal S1 is supplied to the head driver 22 to drive the recording head 23, thereby ejecting ink droplets from the ejection orifices of the recording head 23. In synchronism with this head driving operation (a predetermined period of time before the head driving operation in practice), the main scan motor driving signal generator 27 generates a main scan driving signal for the carriage, and the main scan motor 29 is driven according to a signal from the driver 28. The carriage 2 is moved along the scan rail 11, and performs the first-pass print operation. Upon completion of the scan operation, the main scan motor 29 is driven in the reverse direction, and the carriage 2 is returned to the start position. Furthermore, after an elapse of a predetermined period of time, the remaining thinning print signal S2 is supplied to the head driver 22 to drive the recording head 23. The second-pass print operation is performed in the same manner as in the first-pass print operation. Thereafter, the apparatus prepares for the print operation for the next line.

During these operations, since sub-scan rollers are controlled so as not to move the recording medium, the thinning two-pass print operations can be realized. In the above description, the thinning two-pass print operations have been exemplified. The same applies to multi-pass print operations having three or more passes.

FIG. 9 shows the ink absorption characteristics of a recording medium. The square root ($\sqrt{S}$) of the absorption time is plotted along the abscissa, and the ink absorption quantity ($nl/mm^2$) is plotted along the ordinate. As can be seen from FIG. 9, coated paper which has an ink reception layer as a top layer can absorb a large quantity of ink within a short period of time, while non-coated paper (normal paper such as PPC paper) used in this embodiment has a small initial absorption quantity, and requires a long period of time to absorb the ink.

Figure 10:
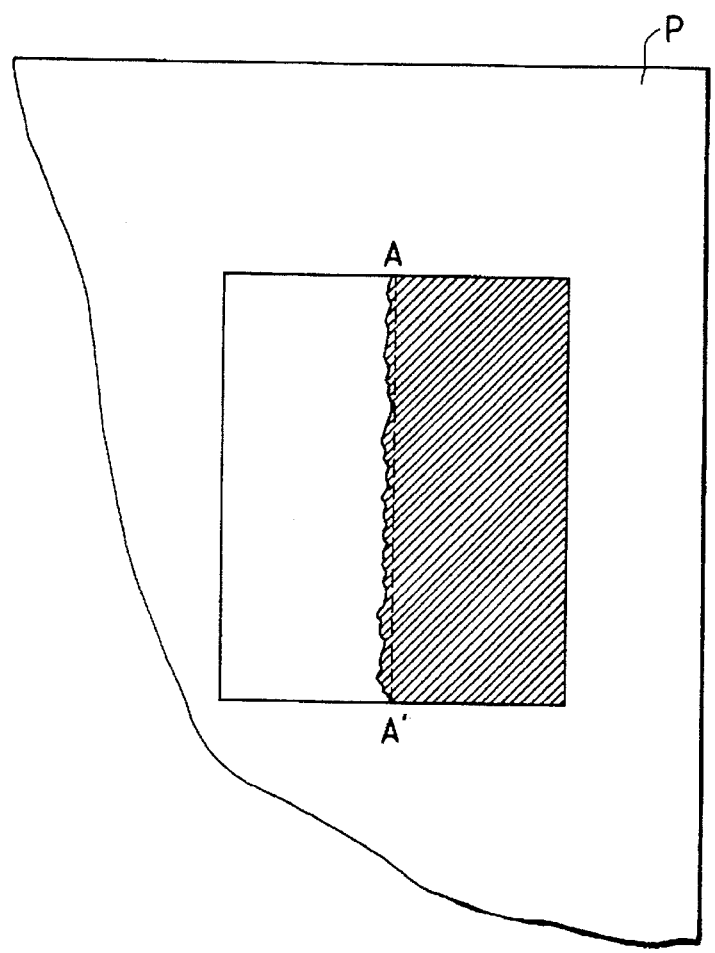
FIG. 10 is a view showing boundary blur.

FIG. 10 illustrates boundary blur. As shown in FIG. 10, unexpected color mixing occurs at a boundary (along a line A–A') between a solid (full-ejection) printed portion of a given color and a solid printed portion of another color. At this time, the ink is blurred along the unevenness or fibers on the sheet surface. Thus, the blur is outstanding since its pattern is neither linear nor smooth, resulting in an image having no sharpness.

FIG. 11 shows a table of the test results of boundary blur of an image obtained when two color ink dots are implanted on a recording medium at substantially the same time. In this table, a mask "○" indicates that the corresponding paper can be put to practical use, a mask "Δ" indicates that the corresponding paper causes relatively poor image quality, and a mark "×" indicates that the corresponding paper cannot be put to practical use. As can be understood from these test results, the ink quantity to be recordable within a short period time is 15 $nl/mm^2$ or less for non-coated paper (normal paper), and is 25 $nl/mm^2$ or less for coated paper.

Figure 12A:
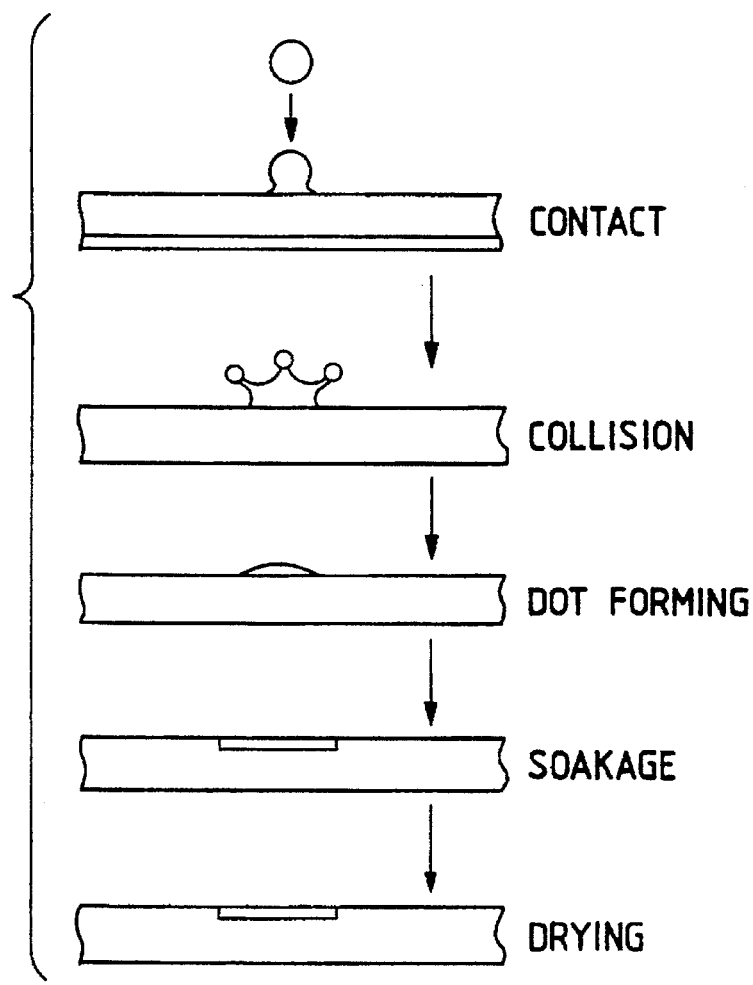
FIGS. 12A and 12B are explanatory views of image boundary blur.
Figure 12B:
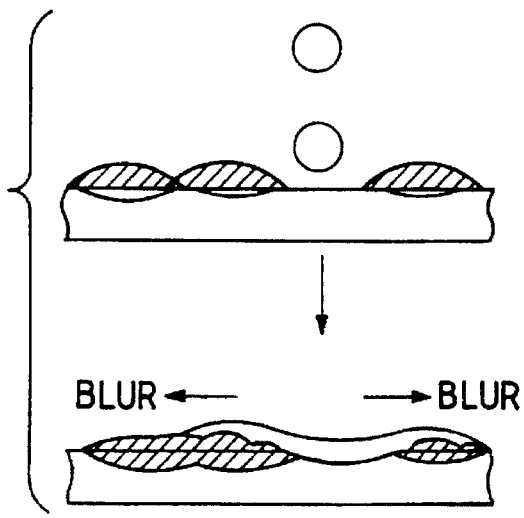

It is presumed that this phenomenon occurs according to the mechanism shown in FIGS. 12A and 12B. More specifically, it is considered that ink is absorbed in paper in the order of contact, collision, dot forming, soakage, and drying (fixing), as shown in FIG. 12A. When ink exceeding an ink quantity which can be absorbed within a short period of time is implanted on, e.g., non-coated paper, the ink overflows, and as shown in FIG. 12B, the overflowing ink is drawn toward the previously implanted adjacent ink, and the blur occurs at the boundary portion therebetween.

(First Embodiment)

In this embodiment, as shown in FIG. 4, the thinning ratio of ink droplets to be implanted per scan of the K ink recording head is set to be 0%, i.e., the use ratio of ejection orifices is set to be 100% (no thinning operation is performed). The thinning ratio of the remaining C, M, and Y ink recording heads is set to be 50%. No paper feed operation is performed between the first and second scan operations, and two scan operations (two-pass print operations) are performed. The above-mentioned thinning ratios are set in the thinning print signal generator 21 according to a mode signal from the print mode selector 20 shown in FIG. 2.

This embodiment exemplifies an arrangement for performing recording on PPC (plain paper copier) paper having blur ratio of ×2 using a multi-nozzle head which has a recording density of 360 DPI (dots per inch) and an ejection quantity of 45 pl of each nozzle. The surface densities obtained when one, two, and three color inks are implanted to overlap each other or to be adjacent to each other using this head are respectively 9.0 nl/mm$^2$, 18.0 nl/mm$^2$, and 27.0 nl/mm$^2$. As can be seen from the above description, in this embodiment, the allowable range of an ink quantity that can be implanted per scan without causing boundary blur is up to a quantity for 1.7 colors.

Therefore, when red, blue, and green are to be recorded in a single scan operation, the inks for two colors are implanted within a short period of time, and an ink overflow state occurs on the sheet surface, thus causing boundary blur. For this reason, the ink implantation quantity per scan of each of the C, M, and Y recording heads is set to have a thinning ratio of 50% (a print signal is thinned out in a checker pattern; see FIG. 3C), as shown in FIG. 5 so as not to cause overflow of the ink. After an elapse of a predetermined period of time (after the ink implanted in the first scan operation is completely fixed), the remaining ink quantity is implanted in a reverse checker pattern in the second scan operation. In FIG. 4, "C checker" represents that a cyan print signal is thinned out in a checker pattern, and "C reverse checker" represents that the cyan print signal is thinned out in a reverse checker pattern. The content in the parentheses in the second scan operation represents the printed state in the scan operation prior to the second scan operation, i.e., in the first scan operation.

Black can be realized by overlapping three colors, i.e., cyan, magenta, and yellow. However, since color development of black realized by overlapping three colors is poor, and it is difficult to precisely overlap three color dots, a chromatic edge is formed, and the ink implantation density per unit time becomes too high. Thus, since only black is implanted separately (using a black ink) without performing color mixing, the K recording head does not require thinning. For this reason, black dots are printed without being thinned out in the first scan operation, and are also printed to overlap the same landing positions without being thinned out in the second scan operation. In this manner, the total implantation quantity of the black ink can be increased to be twice the normal quantity without increasing the number of times of scan operations, and without causing boundary blur, and the black print density can be increased.

At this time, when the K recording head is subjected to recording at a thinning ratio of 50% like in the remaining recording heads, in order to obtain a total implantation quantity of the K ink twice the normal quantity, four scan operations are necessary, and the recording time is almost doubled. When recording is performed in a high-humidity atmosphere, since the ink is not easily fixed, the scan interval time (a time interval from the end of the first scan operation to the beginning of the next scan operation) must be prolonged. In this case, since the wait time is required, an actual print time per scan is prolonged. Thus, as the number of times of scan operations is larger, the total recording time is prolonged.

Therefore, in order to double the implantation quantity of the K ink, the thinning ratio of only the K recording head is changed like in this embodiment in place of setting all the recording heads to have the same thinning ratio, so that the number of scan operations can be decreased to ½, and the recording time can be shortened. In this embodiment, the K recording head is scanned twice without thinning (100%), thereby doubling the total ink implantation quantity. However, the present invention is not limited to this. For example, the thinning ratio of the K recording head may be set to be 25% to increase the total ink implantation quantity to 1.5 times the normal quantity, or the thinning ratio of the K recording head may be set to be 10% to increase the total ink implantation quantity to 1.8 times the normal quantity. In this manner, the total ink implantation quantity can be increased to be larger than the normal quantity.

(Second Embodiment)

FIG. 6 shows a recording method according to the second embodiment of the present invention. An ink jet recording apparatus and recording heads used in this embodiment are the same as those in the first embodiment.

In this embodiment, a record area (L) of each recording head is divided into two portions. C, M, and Y recording heads record checker or reverse checker patterns in the first scan operation, and thereafter, a paper sheet is fed by an L/2 width. In the second scan operation, the remaining reverse checker or checker patterns are printed using other nozzles, thus completing the print operation of the L/2 width portion. At this time, the K recording head performs non-thinning print operations in both the first and second scan operations. FIG. 6 illustrates a perspective view of ejection orifice arrays from the above for the sake of simplicity although they cannot be seen in practice.

The method of this embodiment will be described in more detail below with reference to FIG. 6. In the first scan operation, the print operation is performed using nozzles (ejection orifices) in a record area (1) of each recording head. At this time, the K recording head performs a non-thinning print operation. The C, M, and Y recording heads perform the print operation in a checker pattern by thinning out dots by half the total number of dots. Thereafter, a paper sheet is fed by an L/2 width. In the second scan operation, the print operation is performed using both record areas (1) and (2). At this time, the K recording head also performs a non-thinning print operation. The C, M, and Y recording heads perform the print operation in a reverse checker pattern by thinning out dots by half the total number of dots. At this time, the print operation of a portion corresponding to the record area (2) is completed, and the paper sheet is fed by another L/2 width. In the third scan operation, the print operation is performed using both the record areas. At this time, the K recording head also performs a non-thinning print operation. The C, M, and Y recording heads perform a thinning print operation in a checker pattern. Thereafter, the above-mentioned operations are repeated. The content in the parentheses in the third scan operation represents the printed state in the scan operation prior to the third scan operation, i.e., in the first or second scan operation.

In the second embodiment, since the ink implantation quantity per scan is decreased so as not to cause overflow of the ink like in the first embodiment, ink blur will not occur. In addition, since the black ink is implanted in a quantity twice the normal quantity, the black print density can be increased. Furthermore, according to this embodiment, since the nozzles for forming dots in the first scan operation shown in FIG. 5(a) are different from those for forming dots in the second scan operation, a single line can be formed by using different nozzles, thus preventing density nonuniformity caused by a variation in landing precision or ejection quantity due to a variation in positional precision of the recording head.

(Third Embodiment)

FIG. 7 shows a recording method according to the third embodiment of the present invention. An ink jet recording apparatus and recording heads used in this embodiment are the same as those in the first embodiment.

In this embodiment, a record area (L) of each recording head is divided into four portions. C, M, and Y recording heads record portions thinned out to 25% in the first scan operation. Thereafter, a paper sheet is fed by an L/4 width. In the second scan operation, the recording heads record the next 25% portions, and the paper sheet is fed by another L/4 width. In the third scan operation, the recording heads record the next 25% portions, and the paper sheet is fed by another L/4 width. In the fourth scan operation, the recording heads record the remaining 25% portions, thus completing the print operation of the L/4 portions. At this time, a K recording head performs a 50% thinning print operation in a checker pattern in the first and third scan operations, and performs a 50% thinning print operation in a reverse checker pattern in the second and fourth scan operations. FIG. 7 illustrates a perspective view of ejection orifice arrays from the above for the sake of simplicity although they cannot be seen in practice.

Figure 8:
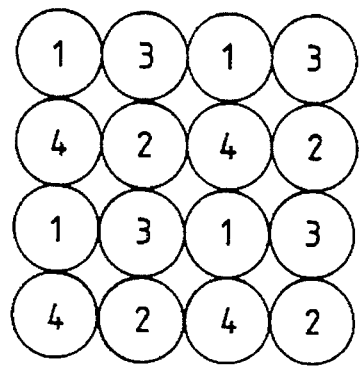
FIG. 8 is an explanatory view for explaining a 25% thinning recording method.

FIG. 8 shows an example of a 25% thinning pattern, and the landing positions and the landing order are represented by numerals. More specifically, in the first scan operation, dots are printed at positions (1) (using nozzles at the positions (1)). In the second scan operation, dots are printed at positions (2). In the third scan operation, dots are printed at positions (3). In the fourth scan operation, dots are printed at positions (4). In this manner, the print operation in a predetermined area is completed by four carriage scan operations (main scan operations).

This operation will be described in detail below with reference to FIG. 7. In the first scan operation, dots are printed by nozzles in record areas (1) of the recording heads. The K recording head prints dots thinned out to 50% in a checker pattern (indicated by "K CH" in FIG. 7), and the C, M, and Y recording heads print dots thinned out to 25%. In the 25% thinning print pattern at this time, dots corresponding to the positions (1) in FIG. 8 (indicated by "C(1)", "M(1)", and "Y(1)" in FIG. 7) are printed. Thereafter, a paper sheet is fed by an L/4 width. In the second scan operation, dots are printed by nozzles in record areas (1) and (2) of the recording heads. At this time, the K recording head prints dots in a 50% reverse checker pattern (indicated by "K RC" in FIG. 7), and the C, M, and Y recording heads print dots corresponding to the positions (2) in FIG. 8 in a 25% thinning print pattern (indicated by "C(2)", "M(2)", and "Y(2)" in FIG. 7). Thereafter, the paper sheet is fed by another L/4 width. Subsequently, in the third scan operation, dots are printed using nozzles in record areas (1), (2), and (3) of the recording heads. In this case, the K recording head prints dots in a 50% checker pattern again, and the C, M, and Y recording heads print dots corresponding to the positions (3) in FIG. 8 in a 25% thinning print pattern (indicated by "C(3)", "M(3)", and "Y(3)" in FIG. 7). Thereafter, the paper sheet is fed by another L/4 width. Subsequently, in the fourth scan operation, dots are printed using nozzles in all the record areas (1), (2), (3), and (4) of the recording heads. In this case, the K recording head prints dots in a 50% reverse checker pattern again, and the C, M, and Y recording heads print dots corresponding to the positions (4) in FIG. 8 in a 25% thinning print pattern (indicated by "C(4)", "M(4)", and "Y(4)" in FIG. 7). The paper sheet is then fed by another L/4 width. Thereafter, the above-mentioned print operations are repeated.

In this embodiment, since the ink implantation quantity per scan is further suppressed as compared to the first and second embodiments, overflow of the ink is more difficult to occur, and the ink blur can be prevented. Since the black ink is implanted in a quantity twice the normal quantity, the black print density can be increased. Although the ink ejection quantity per nozzle of each recording head is doubled, since the ink implantation quantity per scan is suppressed within an ink implantation quantity that does not cause the ink overflow, the print operation free from the ink blur can be performed.

Furthermore, according to this embodiment, since dots are formed by different nozzles in the first, second, third, and fourth scan operations like in the second embodiment, a single line can be formed by using different nozzles. For this reason, density nonuniformity caused by a variation in landing precision or ejection quantity due to a variation in positional precision of the recording head, can be prevented.

In order to further eliminate the ink blur and to shorten the total recording time, the recording operation using the record areas (4) in the fourth scan operation may be omitted, so that the total ink implantation quantity by the C, M, and Y recording heads may be suppressed to 75%, and the total ink implantation quantity by the K recording head may be suppressed to 150%.

The present invention has been described with reference to its preferred embodiments. However, these embodiments merely give an example of the present invention, and do not limit the scope of the present invention. For example, in each of the above embodiments, the multi-pass print method for scanning a single area of a recording medium P a plurality of number of times by a recording head has been exemplified. However, a normal print method for performing a single scan operation may be adopted. The thinning pattern of a print signal is not limited to the checker thinning pattern described above, and various other patterns may be employed.

The present invention brings about excellent effects particularly in a recording head and a recording device of the ink jet system using a thermal energy among the ink jet recording systems.

As to its representative construction and principle, for example, one practiced by use of the basic principle disclosed in, for instance, U.S. Pat. Nos. 4,723,129 and 4,740, 796 is preferred. The above system is applicable to either one of the so-called on-demand type and the continuous type. Particularly, the case of the on-demand type is effective because, by applying at least one driving signal which gives rapid temperature elevation exceeding nucleus boiling corresponding to the recording information on electrothermal converting elements arranged in a range corresponding to the sheet or liquid channels holding liquid (ink), a heat energy is generated by the electrothermal converting elements to effect film boiling on the heat acting surface of the recording head, and consequently the bubbles within the liquid (ink) can be formed in correspondence to the driving signals one by one. By discharging the liquid (ink) through a discharge port by growth and shrinkage of the bubble, at least one droplet is formed. By making the driving signals into pulse shapes, growth and shrinkage of the bubble can be effected instantly and adequately to accomplish more preferably discharging of the liquid (ink) particularly excellent in accordance with characteristics. As the driving signals of such pulse shapes, the signals as disclosed in U.S. Pat. Nos. 4,463,359 and 4,345,262 are suitable. Further excellent recording can be performed by using the conditions described in U.S. Pat. No. 4,313,124 of the invention concerning the temperature elevation rate of the above-mentioned heat acting surface.

As a construction of the recording head, in addition to the combined construction of a discharging orifice, a liquid channel, and an electrothermal converting element (linear liquid channel or right angle liquid channel) as disclosed in the above specifications, the construction by use of U.S. Pat. Nos. 4,558,333 and 4,459,600 disclosing the construction having the heat acting portion arranged in the flexed region is also included in the invention. The present invention can be also effectively constructed as disclosed in JP-A-59-123670 which discloses the construction using a slit common to a plurality of electrothermal converting elements or JP-A-59-138461 which discloses the construction having the opening for absorbing a pressure wave of a heat energy corresponding to the discharging portion.

Furthermore, an ink jet recording apparatus of the present invention may assume the form of an output terminal of information processing equipments such as computers, or of a copying machine combined with a reader, and the like, or of a facsimile apparatus having a transmission/reception function.

As described above, according to the present invention, a clear and sharp image free from undesirable blur at a boundary portion between different colors can be prevented, and having a high print density of black used for characters, thin lines, and the like, which are most important in a recorded image, can be recorded at high speed.

What is claimed is:

1. An ink jet recording apparatus for recording a color image on a recording medium using a plurality of recording means for recording, each said recording means ejecting an ink, said inks being of different colors, comprising:

generating means for generating thinned recording data by thinning out, at a predetermined thinning ratio, recording data to be supplied to said plurality of recording means, said predetermined thinning ratio being predetermined respectively in association with each said recording means;

scanning means for scanning said plurality of recording means relative to said recording medium during a relative scan operation;

driving means for supplying the recording data thinned by said generating means based on said predetermined ratio to said plurality of recording means during the relative scan operation by said scan means, so that a thinned image is recorded on said recording medium; and control means for setting the associated thinning ratio used by the generating means for at least one of said plurality of recording means to be different from the associated thinning ratio for the remaining recording means, wherein each said recording means records by depositing a plurality of ink droplets on said recording medium, and at least some of said ink droplets overlap one another.

2. An apparatus according to claim 1, wherein at least one of said plurality of recording means ejects a black ink, and said control means sets the thinning ratio of said generation means for the recording means for ejecting the black ink to be different from the thinning ratio of said generation means for the remaining recording means.

3. An apparatus according to claim 2, wherein said control means sets the thinning ratio of said generation means for the recording means for ejecting the black ink to be lower than the thinning ratio of said generation means for the remaining recording means.

4. An apparatus according to claim 1, wherein said scan means scans said plurality of recording means relative to a single area of said recording medium a plurality of number of times.

5. An apparatus according to claim 4, wherein each of said plurality of recording means comprises a plurality of ejection portions, and said scan means scans different ejection portions of said plurality of recording means relative to the single area of said recording medium a plurality of number of times.

6. An apparatus according to claim 4, wherein when said plurality of recording means are caused to scan the single area of said recording medium a plurality of number of times, said generation means thins out the recording data using a different pattern corresponding to each relative scan operation so as to generate the thinned recording data.

7. An apparatus according to claim 1, wherein each of said plurality of recording means causes a change in state including formation of bubbles in an ink by thermal energy, and ejects the ink on basis of the change in state.

8. An apparatus according to claim 1, wherein said ink jet recording apparatus is applied to a copying machine having a reader.

9. An apparatus according to claim 1, wherein said ink jet recording apparatus is applied to a facsimile apparatus having a transmission/reception function.

10. An apparatus according to claim 1, wherein said generating means generates the thinned recording data by the thinning out, at the predetermined thinning ratio, the recording data during one scan of the recording means relative to the recording medium.

11. An apparatus according to claim 1, wherein said generating means generates the thinned recording data by the thinning out the recording data in accordance with a predetermined pattern, during one scan of the recording means relative to the recording medium.

12. An ink jet recording apparatus for recording a color image on a recording medium using at least a first recording means for recording and a second recording means for recording, said recording means respectively ejecting a first color ink and a second color inks, comprising:

main scan means for main scanning said first and said second recording means relative to a single area of said recording medium a plurality of number of times in a main scan operation;

generating means for generating thinned recording data by thinning out recording data to be supplied to said first and said second recording means at a predetermined thinning ratio associated with each said recording means using different patterns in correspondence with the plurality of number of times in the main scan operation, said predetermined thinning ratio being predetermined respectively in association with each said recording means;

driving means for supplying the recording data thinned by said generating means based on said predetermined ratio to said first and said second recording means during the main scan operation by said main scan means, so that a thinned image is recorded on said recording medium; and control means for setting the thinning ratio of said generating means associated with said first recording means to be different from the thinning ratio associated with said second recording means, wherein each said recording means records by depositing a plurality of ink droplets on said recording medium, and at least some of said ink droplets overlap one another.

13. An apparatus according to claim 12, further comprising:

sub-scan means for sub-scanning said first and second recording means relative to said recording medium in a sub-scan operation.

14. An apparatus according to claim 13, wherein said sub-scan means inhibits the sub-scan operation until the plurality of number of times of the main scan operation are performed.

15. An apparatus according to claim 13, wherein each of said first and second recording means has a plurality of ejection portions, and performs recording of a predetermined width on said recording medium by the main scan operation.

16. An apparatus according to claim 15, wherein said sub-scan means sub-scans said first and second recording means by a width smaller than the predetermined width upon each of the plurality of number of times of the main scan operation, so that different ejection portions of said first and second recording means main-scan the single area of said recording medium a plurality of number of times.

17. An apparatus according to claim 16, wherein said sub-scan means sub-scans said first and second recording means by a width half the predetermined width upon each of the plurality of number of times of main scan operation, so that different ejection portions of said first and second recording means main-scan the single area of said recording medium twice.

18. An apparatus according to claim 16, wherein said sub-scan means sub-scans said first and second recording means by a width ¼ the predetermined width upon each of the plurality of number of times of main scan operation, so that different ejection portions of said first and second recording means main-scan the single area of said recording medium four times.

19. An apparatus according to claim 12, wherein said first recording means ejects a black ink, and said control means sets the thinning ratio of said generation means for said first recording means to be lower than the thinning ratio of said generation means for said second recording means.

20. An apparatus according to claim 12, wherein each of said first and second recording means cause a change in state including formation of bubbles in an ink by thermal energy, and ejects the ink on basis of the change in state.

21. An apparatus according to claim 12, wherein said ink jet recording apparatus is applied to a copying machine having a reader.

22. An apparatus according to claim 12, wherein said ink jet recording apparatus is applied to a facsimile apparatus having a transmission/reception function.

23. An apparatus according to claim 12, wherein said generating means generates the thinned recording data by the thinning out, at the predetermined thinning ratio, the recording data during one scan of the recording means relative to the recording medium.

24. An apparatus according to claim 12, wherein said generating means generates the thinned recording data by the thinning out the recording data in accordance with a predetermined pattern, during one scan of the recording means relative to the recording medium.

25. An ink jet recording method for recording a color image on a recording medium, comprising the steps of:

providing a plurality of recording means for recording by ejecting an ink, said inks being of different colors;

generating thinned recording data by thinning out recording data to be supplied to said plurality of recording means at a predetermined associated thinning ratio wherein the predetermined thinning ratio associated with at least one of said plurality of recording means is different from the thinning ratio associated with the remaining recording means, said predetermined thinning ratio being predetermined respectively in association with each said recording means;

scanning said plurality of recording means relative to said recording medium during a relative scan period; and supplying the recording data thinned in said generating step based on said predetermined ratio to said plurality of recording means during the relative scan periods, so that a thinned image is recorded on said recording medium, wherein each said recording means records by depositing a plurality of ink droplets on said recording medium, and at least some of said ink droplets overlap one another.

26. A method according to claim 25, wherein at least one of said plurality of recording means ejects a black ink, and in the generating step, the thinning ratio for the recording means for ejecting the black ink is different from the thinning ratio for the remaining recording heads.

27. A method according to claim 26, wherein in the generating step, the thinning ratio for the recording means for ejecting the black ink is lower than the thinning ratio for the remaining recording means.

28. A method according to claim 25, wherein each of said first and second recording means causes a change in state including formation of bubbles in an ink by thermal energy, and ejects the ink on basis of the change in state.

29. A method according to claim 25, wherein in said generating step, the thinned recording data is generated by the thinning out the recording data at the predetermined thinning ratio during one scan of the recording means relative to the recording medium.

30. A method according to claim 25, wherein in said generating step, the thinned recording data is generated by the thinning out the recording data in accordance with a predetermined pattern, during one scan of the recording means relative to the recording medium.

31. An ink jet recording method for recording a color image on a recording medium, comprising the steps of:
  providing at least a first recording means for recording and a second recording means for recording, said first and said second recording means respectively ejecting a first color ink and a second color ink;
  generating thinned recording data by thinning out recording data to be supplied to said first and said second recording means at a predetermined thinning ratio, wherein the predetermined thinning ratio for said first recording means is different from the predetermined thinning ratio for the second recording means, wherein the predetermined thinning ratio for each of the recording means is predetermined respectively in association with each said recording means;
  scanning said first and said second recording means relative to said recording medium during a scan period;
  supplying the recording data thinned in said generating step based on said predetermined ratio to said first and said second recording means during the scan period, so that a thinned image is recorded on said recording medium; and
  repeating the generating step, the scanning step, and the supplying step,
  wherein the generating step includes the step of generating the thinned recording data using different patterns in correspondence with main scan operations, and the scanning step includes the step of scanning said first and said second recording means relative to a single area of said recording medium,
  wherein each said recording means records by depositing a plurality of ink droplets on said recording medium, and at least some of said ink droplets overlap one another.

32. A method according to claim 31, wherein said first recording means ejects a black ink, and
  in the generating step, the thinning ratio for said first recording means is lower than the thinning ratio for the second recording means.

33. A method according to claim 31, wherein each of said first and second recording means causes a change in state including formation of bubbles in an ink by thermal energy, and ejects the ink on basis of the change in state.

34. A method according to claim 31, wherein the different patterns in the generating step include checker and reverse checker patterns.

35. A method according to claim 34, wherein each of said first and second recording means causes a change in state including formation of bubbles in an ink by thermal energy, and ejects the ink on basis of the change in state.

36. A method according to claim 31, wherein in said generating step, the thinned recording data is generated by the thinning out the recording data at the predetermined thinning ratio during one scan of the recording means relative to the recording medium.

37. A method according to claim 31, wherein in said generating step, the thinned recording data is generated by the thinning out the recording data in accordance with a predetermined pattern, during one scan of the recording means relative to the recording medium.

38. An ink jet recording method for recording a color image on a recording medium, comprising the steps of:
  providing at least a first recording means for recording and a second recording means for recording, said first and said second recording means respectively ejecting a first color ink and a second color ink, wherein each of said first and said second recording means has a plurality of ejection portions, and effects recording of a predetermined width on said recording medium;
  generating thinned recording data by thinning out recording data to be supplied to said first and said second recording means at a predetermined thinning ratio, wherein the predetermined thinning ratio associated with said first recording means is different from the thinning ratio associated with the second recording means, the predetermined thinning ratio for each of the recording means being predetermined respectively in association with each said recording means;
  main-scanning said first and said second recording means relative to said recording medium during a main scan period;
  supplying the recording data thinned in said generating step based on said predetermined ratio to said first and said second recording means during the main scan period, so that a thinned image is recorded on said recording medium; and
  sub-scanning said first and said second recording means by a width smaller than the predetermined width, so that different said ejection portions of said first and said second recording means main-scan a single area of said recording medium,
  wherein each said recording means records by depositing a plurality of ink droplets on said recording medium, and at least some of said ink droplets overlap one another.

39. A method according to claim 38, further comprising the steps of:
  repeating the generating step, the main-scanning step, the supplying step, and the sub-scanning step, wherein the generating step includes the step of generating the thinned recording data using different patterns corresponding to main scan operations.

40. A method according to claim 39, wherein the different patterns in the generating step include checker and reverse checker patterns.

41. A method according to claim 38, wherein the sub-scanning step includes the step of sub-scanning said first and second recording means by a width half the predetermined width, so that the different ejection portions of said first and second recording means main-scan the single area of said recording medium twice.

42. A method according to claim 38, wherein the sub-scanning step includes the step of sub-scanning said first and second recording means by a width ¼ the predetermined width, so that the different ejection portions of said first and second recording means main-scan the single area of said recording medium four times.

43. A method according to claim 38, wherein in said generating step, the thinned recording data is generated by the thinning out the recording data at the predetermined thinning ratio during one scan of the recording means relative to the recording medium.

44. A method according to claim 38, wherein in said generating step, the thinned recording data is generated by the thinning out the recording data in accordance with a predetermined pattern, during one scan of the recording means relative to the recording medium.

45. A recording method for recording a color image on a recording medium through increasing a density of a specified color, comprising the steps of:
  providing a plurality of recording means for recording, each said recording means ejecting an ink, said inks being of different colors;

generating thinned recording data by thinning out recording data to be supplied to said plurality of recording means at a predetermined thinning ratio, each said recording means having an associated said thinning ratio, wherein the associated thinning ratio for at least one of said plurality of recording means differs from the associated thinning ratio for the remaining recording means, said predetermined thinning ratio being predetermined respectively in association with each said recording means;

wherein the thinning ratio for the recording means for ejecting ink of the specified color is smaller than the thinning ratios for those of the recording means which eject the inks of other colors;

scanning said plurality of recording means relative to said recording medium during a relative scan period; and supplying the recording data thinned in said generating step based on said predetermined ratio to said plurality of recording means during the relative scan period, so that a thinned image is recorded on said recording medium, wherein each said recording means records by depositing a plurality of ink droplets on said recording medium, and at least some of said ink droplets overlap one another.

* * * * *

UNITED STATES PATENT AND TRADEMARK OFFICE
CERTIFICATE OF CORRECTION

PATENT NO. : 5,661,508
DATED : August 26, 1997
INVENTOR(S) : HITOSHI SUGIMOTO, ET AL.

It is certified that error appears in the above-identified patent and that said Letters Patent is hereby corrected as shown below:

COLUMN 12

Line 65, "inks," should read --ink,--.

COLUMN 14
Line 2, "cause" should read --causes--;

COLUMN 15
Line 63, "of;" should read --of:--.

Signed and Sealed this

Twelfth Day of May, 1998

Attest:

BRUCE LEHMAN

Attesting Officer   Commissioner of Patents and Trademarks